United States Patent [19]

Meier

[11] Patent Number: 5,189,361

[45] Date of Patent: Feb. 23, 1993

[54] HIGH VOLTAGE DC POWER GENERATION CIRCUIT POWERED FROM THE ALTERNATOR OF A MOTOR VEHICLE

[76] Inventor: Werner A. Meier, 14 Main Road, Gonubie, East London, Cape Province, South Africa

[21] Appl. No.: 735,813

[22] Filed: Jul. 25, 1991

[30] Foreign Application Priority Data

Nov. 14, 1990 [ZA] South Africa ............... 90/9130

[51] Int. Cl.⁵ .................... H02M 7/00; H02P 9/00
[52] U.S. Cl. .................................. 322/90; 322/7; 363/126
[58] Field of Search ................... 322/7, 8, 28, 90; 320/6, 15, 17, 61; 307/16; 219/133, 134, 135; 363/101, 126

[56] References Cited

U.S. PATENT DOCUMENTS

| | | | |
|---|---|---|---|
| 3,316,416 | 4/1967 | Carlson | 307/17 |
| 3,676,694 | 7/1972 | Schneider et al. | 219/134 X |
| 3,899,652 | 8/1975 | Terry et al. | 219/133 |
| 3,962,621 | 6/1976 | Raver | 320/15 |
| 4,009,431 | 2/1977 | Johnson | 322/7 |
| 4,339,704 | 7/1982 | McSparran et al. | 322/90 |
| 4,555,753 | 11/1985 | Takahashi | 363/126 |
| 4,780,659 | 10/1988 | Bansal et al. | 322/90 X |
| 4,868,480 | 9/1989 | van der Linde | 322/90 X |
| 4,950,972 | 8/1990 | Berg | 322/90 X |

FOREIGN PATENT DOCUMENTS

| | | |
|---|---|---|
| 2650851 | 5/1978 | Fed. Rep. of Germany ........ 322/90 |
| 3719376 | 12/1987 | Fed. Rep. of Germany . |
| 0879072 | 12/1987 | South Africa . |
| 2065936 | 7/1981 | United Kingdom . |

OTHER PUBLICATIONS

QST Amateur Radio, Exum et al., "A Transistorless 300-Watt Mobile Power Supply", May, 1966, pp. 23-25.

Primary Examiner—Steven L. Stephan
Assistant Examiner—Kristine Peckman
Attorney, Agent, or Firm—Birch, Stewart, Kolasch & Birch

[57] ABSTRACT

A power generator circuit is adapted to be driven by the output of a vehicle alternator. The circuit includes an input for receiving a rectified DC output from the alternator, and a pair of step-up transformers which are connected to the AC output from the alternator. The rectifiers are connected to the outputs of the step-up transformers, and are connected in series with the rectified DC output from the alternator to provide a relatively high voltage DC output. This output can be used to operate power tools, for example. The circuit includes a welding output, and allows normal charging of the vehicle battery when not being used as a power source.

9 Claims, 3 Drawing Sheets

HIGH VOLTAGE DC POWER GENERATION CIRCUIT POWERED FROM THE ALTERNATOR OF A MOTOR VEHICLE

BACKGROUND OF THE INVENTION

This invention relates to a power generator circuit which is connectable to an alternator to produce a relatively high voltage DC output.

Various power generator circuits are known which are used in conjunction with motor vehicle alternators to provide a 120 volt or 240 volt DC output which can be used, for example, for operating power tools. It is also known to provide a welding output which is connected directly to the output of a bridge rectifier associated with the alternator. In the past, attempts have been made to feed the AC output of the alternator into a three phase step-up transformer in order to obtain a high voltage output. However, such circuits proved to have poor performance, with low power output and poor regulation.

A number of circuits employing capacitive voltage multipliers also exist. The main disadvantage of such circuits is that they require the capacitors to pass high ripple currents, which cause rapid heating of the capacitors. The operating temperature of the capacitors must generally be limited to 80° C., which thus restricts the continuous output rating of such circuits. Apart from this, the electrolytic capacitors used are very expensive and deteriorate relatively rapidly in use, particularly when exposed to high temperatures.

SUMMARY OF THE INVENTION

According to the invention a power generator circuit is adapted to be driven by the output of an alternator and includes input means for receiving a rectified DC output from the alternator; at least one step-up transformer for receiving an AC output from the alternator and raising its voltage; rectifier means for rectifying the output of the step-up transformer; and means for connecting the output of the rectifier means and the rectified DC output from the alternator in series to provide a relatively high voltage DC output. Preferably, a pair of step-up transformers are provided, each transformer being fed with an AC output from at least one winding of the alternator, and the outputs of respective rectifier means associated with each transformer being added in series to the rectified DC output from the alternator.

DESCRIPTION OF EMBODIMENTS

Figure 1:
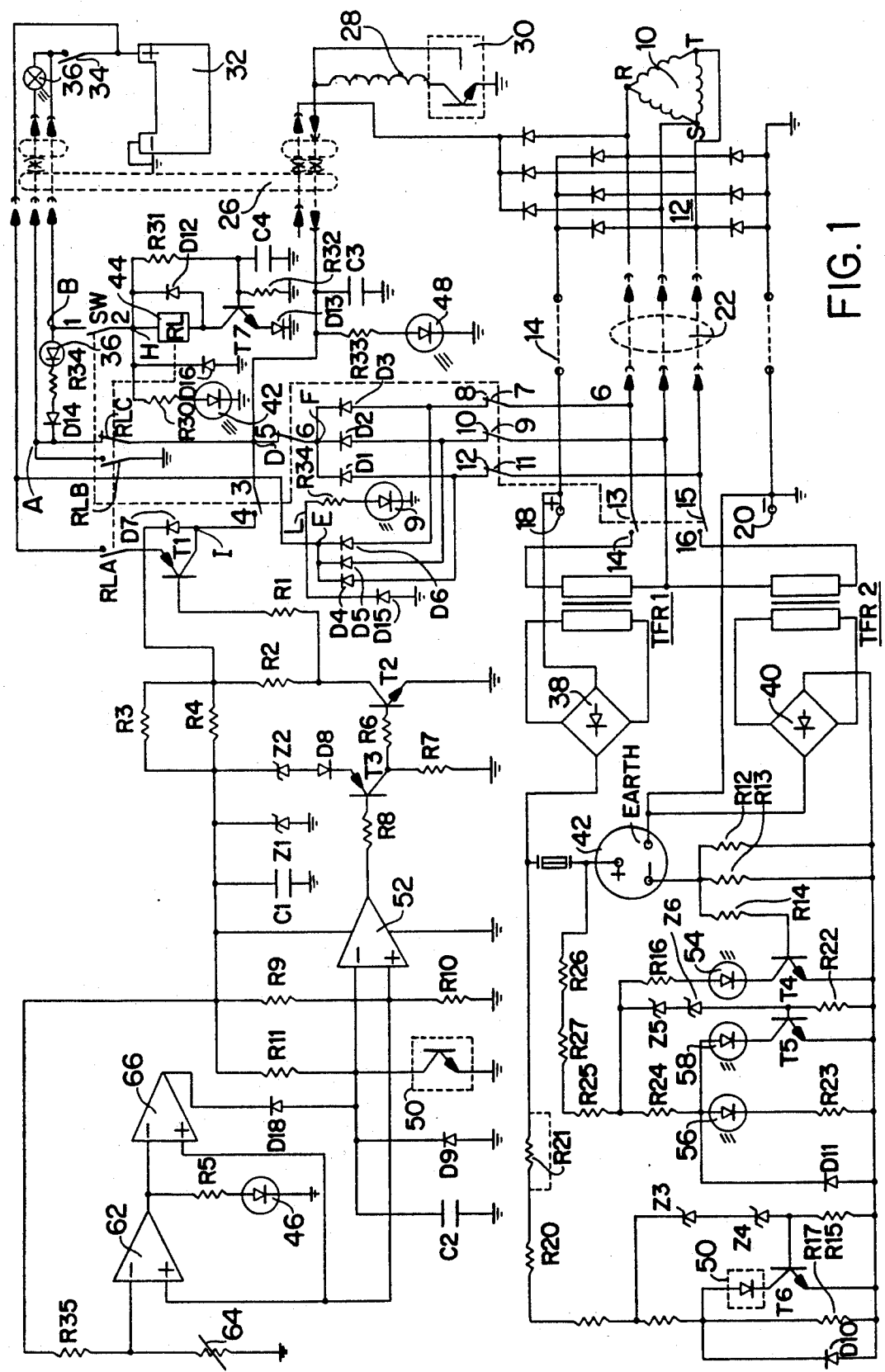
FIG. 1 is a schematic circuit diagram of a first embodiment of a power generator circuit according to the invention.

Referring to FIG. 1, a delta connected alternator 10 is shown, the stator-windings of the alternator being connected to respective pairs of diodes of a three phase rectifier bridge 12. The output of the rectifier bridge 12 is fed, via pairs of lugs 14 and 16, to respective positive and negative welding terminals 18 and 20. The three stator windings of the alternator 10 are also connected, via a plug/socket connector 22, to the power generator circuit. The alternator circuit includes a set of excitation diodes 24, the cathodes of which are connected together, via a plug/socket connector 26, to the power generator circuit.

A two position multi pole selector switch is provided, which has sixteen contacts, which switches the power generator circuit between a "Normal" mode and a "Power" mode. In the "Normal" mode the power generator circuit allows normal operation of the motor vehicle in which the alternator 10 is installed. In this mode, the three phase AC output of the alternator 10 is connected, via the switch contacts 75/85, 95/105 and 115/125, to two sets of diodes, D1 to D3 and D4 to D6. The diodes D1 to D3 are low current diodes which substitute for the three excitation diodes 24 of the alternator and which form the positive half of a three phase full wave bridge rectifier, the three diodes of the negative half of the alternator diode bridge 12 serving as the other half of this bridge. The positive summed output of the diodes D1 to D3 (point F on the diagram) is fed via the switch contacts 55/65 to an ignition or charge light of the vehicle and also to the alternator rotor 28 and voltage regulator 30.

The diodes D4 to D6 are power diodes and also use the negative half of the alternator bridge rectifier 12 to form a full wave bridge rectifier. The summed positive output of the diodes D4 to D6 (point E in FIG. 1) is fed to the positive terminal of the vehicle battery 32, to charge the battery.

The above described arrangement functions in the same way as the normal battery charging system of the vehicle, except that some of the diodes in the circuit are housed inside the casing of the power generator circuit. However, the normal charging circuit operation of the vehicle remains unchanged.

When the vehicle ignition switch is turned on and the engine is started, the alternator rotates and is fed with a small excitation current from the battery. This current is fed via the ignition switch 34, through the ignition or charging light 36, to point A in the diagram of FIG. 1. The current then passes through the closed contacts RLC of a relay to point D on the diagram and thence to the alternator rotor 28 and the voltage regulator 30. The small amount of excitation supplied to the rotor in this way causes the alternator to produce an AC output which energises the circuit described above and the alternator enters its normal self-exciting mode of operation. The circuit provides sufficient excitation to produce an output of 14 volts DC at point D in the circuit, which is sufficient to ensure correct operation of the standard regulator 30. In this mode of operation, battery charging takes place through the diodes D4 to D6 until the battery is fully charged to 14 volts DC. At this point, the voltage at point D reaches 14 volts DC and the ignition or charge light will extinguish.

Under these conditions, the voltage between the welding terminals 18 and 20 would also be 14 volts DC, and these terminals could be connected to a second battery (for example, the battery of another vehicle) via cables as an emergency battery charging measure, without adversely affecting the operation of the host vehicle electrical system in any way.

To change from the "normal" mode to the "power" mode of operation of the power generator circuit, the two position switch is simply switched over to its second position. As this happens, the following takes place: the switch contacts 55/65 which connect points F and D on the diagram break early and cut excitation to the alternator, reducing the alternator output. The switch contacts 75/85, 95/105 and 115/125 also open and cut off the AC supply to the diodes D1 to D6. Since these latter switch contacts are opened with excitation to the alternator already removed, the current switched is relatively low. Opening of the contacts also stops battery charging.

As the selector switch rotates to the "power" position, its contacts 1/2 and 3/4 close. (The latter contacts are also early break/late make.) The contacts 1/2 connect point B on the diagram to point H, raising the latter point to 12.6 volts DC (the voltage at the battery positive terminal) and causing a "Unit on" LED 42 to illuminate. A relay 44 is energised via a transistor T7 after a short delay due to the charging of a capacitor C4. With the relay 44 energised, the contacts RLC open, disconnecting the ignition/charging light of the vehicle 36 (point A) from point D of the excitation circuit. At the same time, contacts RLA and RLB of the relay close. The contacts RLB connect point A of the ignition circuit to ground, illuminating the ignition light 36 as well as the operating light of the power generator circuit, providing an indication that the selector switch has been set to the "Power" mode and that no battery charging is taking place.

The closing of the contacts RLA supplies 12.6 volts from the battery to a series regulator transistor T1 at point G. This transistor passes current to point I of the circuit, through the closed switch contacts ¾ and to the alternator excitation circuit. At the same time, an "Excitation on" LED 48 is illuminated.

Control of alternator excitation is thus passed from the normal regulator 30 to the regulator transistor T1. The normal regulator 30 will remain in a hard-on state, since the battery voltage (at 12.6 volts DC) is well below 14 volts DC, the switching point of the normal regulator. With the alternator once again being excited, three phase AC will be present at the input to the transformers TFR1 and TFR2, and a rectified DC output will be present at the welding terminals 18 and 20. The primary windings of the transformers are connected to the alternator output via the switch terminals 135/145 and 155/165, respectively.

The secondary windings of the transformers are connected to respective rectifiers 38 and 40. The outputs of these rectifiers are connected in series with the rectified output of the alternator rectifier bridge 12.

The positive terminal of the first rectifier 38 is connected to the output socket 42 via a fuse, and is also connected to a voltage sensing circuit via resistors R26 and R21. The negative side of the rectifier 38 is connected to the positive welding terminal 18. The positive terminal of the rectifier 40 is connected to the negative welding terminal 20, which also serves as a ground connection. The negative side of the rectifier 40 is connected to the output socket 42 via load sensing resistors R12 and R13 and also to the negative side of the voltage sensing circuit. Thus, the outputs of the rectifiers 38 and 40 and the rectified welding output are all in series, so that the voltage between the positive and negative terminals of the output socket 42 will be the sum of these output voltages. The output voltage at the terminals of the socket 42 will depend on the rotational speed of the alternator, and on the step-up ratio of the transformers TFR1 and TFR2, which can be selected for 120 volts or 240 volt operation.

As the output voltage reaches the predetermined nominal level (i.e. 120 volts or 240 volts) this voltage appears across the voltage divider comprising the resistors R21, R20, R19, R18 and R17. When the voltage developed across the resistors R18 and R17 is greater than the threshold voltage set by a pair of zener diodes Z3 and Z4, these diodes conduct and forward bias a transistor T6 which conducts, passing current through the diode of an optoisolator 50. The transistor of the optoisolator switches on, pulling down the inverting input of an opamp 52 which is normally held high via a resistor R11. The non-inverting input of the opamp 52 is connected to the centre point of a voltage divider comprising two resistors R9 and R10 and is held at approximately six volts. Thus, while the non-inverting input of the opamp is held high, the output of the opamp is low, forward biasing a transistor T3. The transistor T3 thus conducts, raising the voltage across a resistor R7, and in turn forward biasing a transistor T2. The transistor T2 thus conducts and grounds the base of the regulating transistor T1.

Thus, when the voltage at the output socket 42 reaches the predetermined nominal level, illumination of the diode of the optoisolator 50 causes the inverting input of the opamp 52 to be grounded, so that the opamp produces a high output. This reverse biases the transistor T3, which switches off, removing the base current drive to the transistor T2 which also turns off, thus turning off the transistor T1. This removes the alternator excitation current until the output voltage drops back to its correct level. Thus, it can be seen that there is a feedback loop controlling the voltage at the output socket 42.

The negative leg of the output socket is connected in series with two load detecting resistors R12 and R13. These resistors are selected so that when the load current reaches a predetermined level, the voltage drop across the resistors reaches approximately 0.6 volts, forward biasing a transistor T4. The transistor turns on, illuminating an "Overload" LED 54.

A second voltage detector is provided, which comprises resistors R26, R27, R25, R24 and R23, a pair of zener diodes Z5 and Z6, and a transistor T5. This voltage detector operates in much the same manner as the previously described voltage detector, but is arranged to illuminate an LED 58 when the correct output voltage is reached. This allows the engine speed to be increased gradually, while the user monitors the output of a further LED 56, until the LED 58 illuminates. The LED 56 is in series with the resistors R26, R27, R25, R24 and R23, and illuminates with a brightness proportional to the output voltage. Full brightness is achieved at about the point where the LED 58 illuminates.

It will be noted that the above described voltage regulation process also has the effect of controlling the output voltage at the welding terminals 18 and 20, preventing this voltage from rising to unsafe levels.

In the above described "power" mode, current can be drawn from the output socket 42 or from the welding terminals 18 and 20, without it being necessary to adjust a switch. Thus, it is not necessary for high currents to be switched at any stage.

An over-temperature LED 46 is provided to warn against excessive operating temperatures of the control unit. The over-temperature monitoring circuit includes a comparator 62 which has its positive input connected to the junction of the resistors R9 and R10 as a voltage reference, and its negative input connected to a voltage divider comprising a negative temperature coefficient thermistor 64 and a resistor R35. The component values are chosen so that increasing temperature eventually causes the comparator 62 to change state and to illuminate the LED 46, as the negative input voltage drops below that of the positive input. An invertor 66 is fed with the output of the comparator 62, and is arranged to shut down the voltage regulator transistor T1 under over-temperature conditions, by grounding the inverting input of the opamp 52.

When the selector switch is returned to the "normal" position, the early break contacts ¾ opens first, disconnecting the excitation current from the regulator transistor T1. The contacts ½ also open, de-energising the relay 44 and thus opening the contacts RLA and RLB, and closing the contacts RLC. Thus, the vehicle ignition light 36 is again connected to point D of the excitation circuit. The switch contacts 7s/8s, 9s/10s and 11s/12s are also closed, reconnecting the AC supply from the alternator to the diodes D1 to D6, restoring the battery charging and alternator excitation outputs. At the same time, the contacts 13s/14s and 15s/16s open to disconnect the transformers from the alternator. Finally, the late make/early break switch contacts 5/6 close, allowing alternator excitation to resume as normal.

It is not necessary to switch off the vehicle engine to switch from the "Power" to "Normal" mode or vice versa, since the circuit is designed automatically to provide no-load switching.

The described circuit does not require irreversible modifications to the alternator, and the vehicle can readily be converted to a standard condition by removing the power unit, leaving the connector 22 disconnected, disconnecting the negative welding cable and connecting the positive welding cable to the battery positive, and fitting a shorting plug to link the ignition/charge light, the alternator rotor/regulator circuit and the existing alternator excitation diodes.

Figure 2:
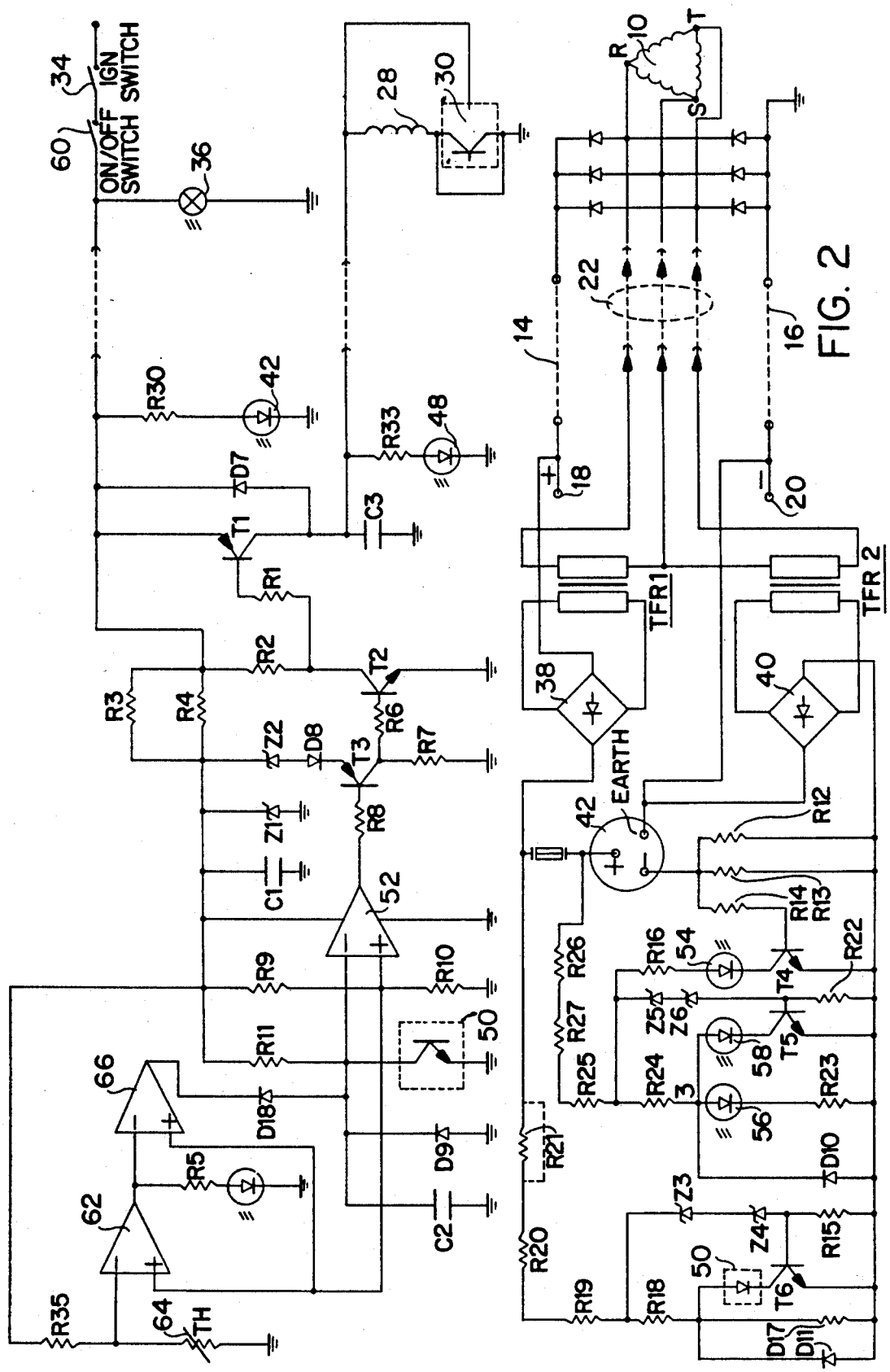
FIG. 2 is a schematic circuit diagram of a simplified version of the circuit of FIG. 1.

The circuit shown in FIG. 2 is a simplified version of the power generator circuit and is intended for "piggy back" use in a vehicle where it is only required to provide a welding output and a high voltage DC output. This circuit is generally used with a second alternator, and does not require a selector switch, since it is permanently connected in a "power" mode. Excitation to the additional alternator is provided by an on/off switch 60 which provides excitation from the battery via the regulator transistor T1, much as described above. The "piggy back" system of FIG. 2 is advantageous in that it can be fitted as an accessory and requires no modifications at all to the normal vehicle ignition/charging system.

Figure 3:
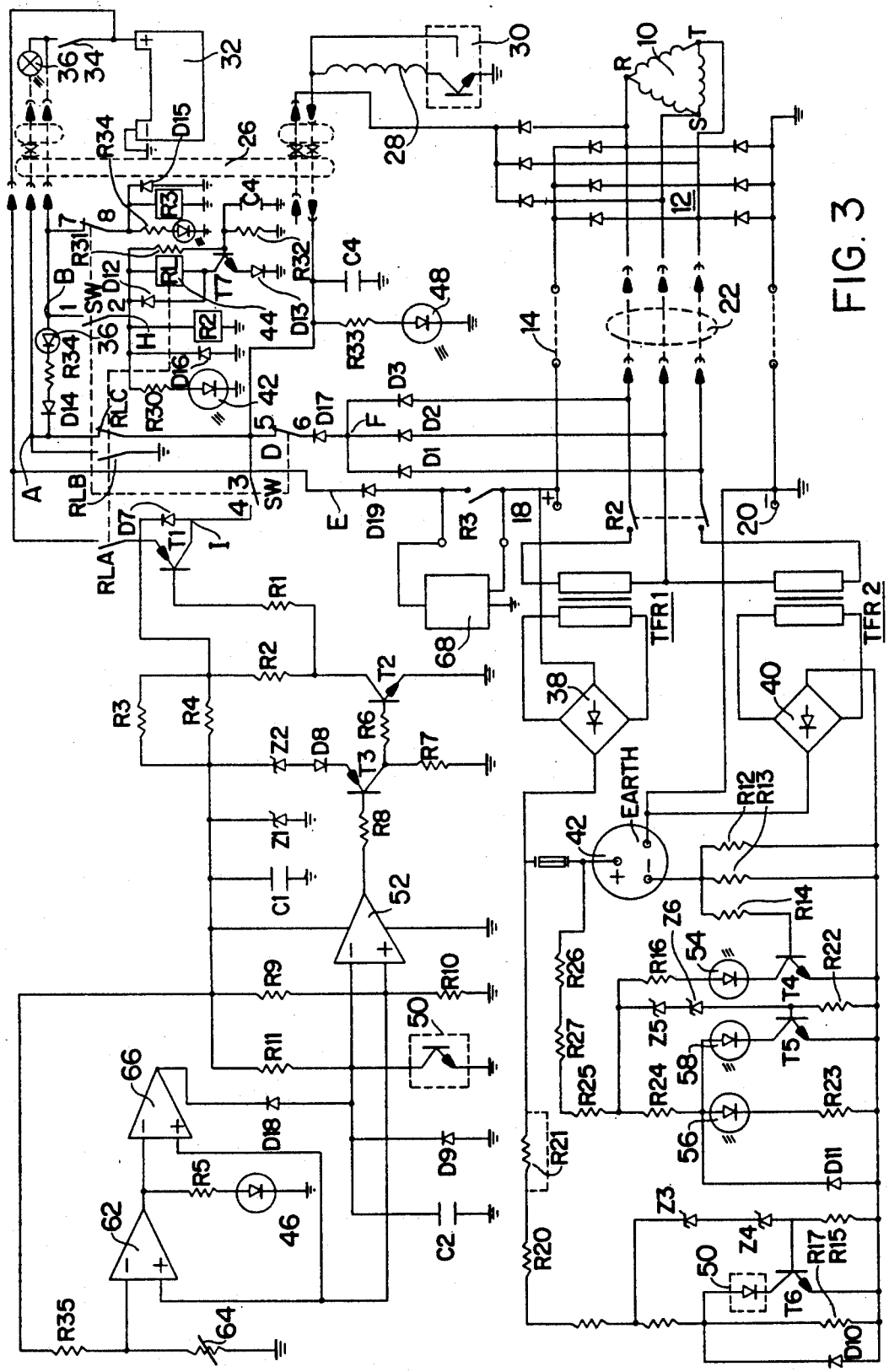
FIG. 3 is a schematic circuit diagram of a high current version of the circuit.

The circuit shown in FIG. 3 is a variation of the power generator circuit for use with vehicles which require high current battery charging, or which draw heavy currents. For example, some vehicles such as rally cars are fitted with multiple spot lamps, and may draw as much as 70 A at 12.6 V when operating at night.

In the circuit of FIG. 3, use is made of the relatively large cross section cable 14 from the alternator to the battery charging circuit. The battery charging circuit is connected to the positive welding terminal 18 and connected via a switch or relay contact R3 and a gating diode D19 to point E of the circuit. The switch or relay contact R3 can represent the switch contacts 7/8, 9/10 and 11/12 all connected in parallel, the contacts of a single large capacity relay, or the contacts of several relays connected in parallel, in which case the relay or relays are activated by additional switch contacts ⅞ of a double pole change-over switch. The functions of the switch contacts ½, ¾ and 5/6 remain as described with reference to FIG. 1.

In place of the switch contacts 13/14 and 15/16 controlling the connection of the transformers to the alternator, a relay R2 is used, in parallel with the relay 44. The switch contacts 1/2 close when the "power" mode is selected, energising the relay RL2 and causing its contact to close at the same time as was the case when using the switch contacts 13/14 and 15/16 in the circuit of FIG. 1. The relay 44 and the switch contacts 3/4 continue to function as described with reference to FIG. 1.

In the "normal" mode of operation the excitation diodes D1, D2 and D3 are directly connected to point K at the output of the alternator and deliver excitation current to the point D via the diode D17 and the switch contacts 5/6. The closed switch contacts ⅞ cause the relay R3 to be energised via the vehicle ignition switch 34. This closes the contacts of the relay R3 and allows battery charging via the diode D19. This diode is fitted to prevent the battery delivering current back into the welding terminals. The diode D17 is fitted to ensure that the regulator 30 boosts the output of the alternator to compensate for the 0.6 volt drop across the diode D19, to maintain the battery charging voltage at 14 V.

A battery boost circuit 68 is connected across the contacts of the relay R3, so that the boost circuit is shorted out when the contacts of the relay R3 are closed, and the unit is in its normal battery charging mode. However, when the unit is being used for welding or is supplying high voltage power, the contacts of the relay R3 are open and the positive welding terminal 18 is at a voltage of approximately 40 V DC. This potential is connected through the boost circuit 62 to the anode of the diode D19 and thus to the battery. The effect of this is to feed additional charging current to the battery in order to prolong the period for which welding or high power operation can take place. However, the battery voltage is maintained below 13 V DC, so that it is still below the regulator current voltage.

The described power generator circuit does not suffer from the same heat problems as capacitive voltage multiplier circuits. For example, a similarly rated capacitive multiplier circuit was tested against a prototype circuit according to the invention and was found to reach a temperature of approximately 85° C. within 10 minutes when operated at approximately 2,000 watts output at 20° C. In comparison, the circuit of the invention was able to provide 2,000 watts continuously, with its temperature rising to a maximum of approximately 38° C. The transformers TFR1 and TFR2 can be relatively small, low rated transformers, typically having a 50 VA rating for 50 Hz operation. With an alternator speed of approximately 7,000 rpm, the relatively high frequency AC current supplied to the transformers allows an effective rating of approximately 400 VA. Apart from being small, robust and insensitive to heat, the transformers in question each cost approximately one half as much as the cost of a single capacitor used in an equivalent capacitive voltage multiplier circuit. By contrast, prior art circuits employing three phase transformers without the assistance of the existing rectified alternator output tend to have poor efficiency and regulation, and have increased mass relative to the described circuit.

The described circuit is designed so that it includes diodes which mimic the operation of existing diodes in the alternator system of the vehicle, ensuring that the normal functions of the electrical system are unaffected in use.

The provision of separate battery charging diodes, which share half of the main alternator rectifier bridge, ensures that the battery charging circuit is isolated from the welding circuit, which prevents current being drawn from the battery during welding. This rectifier arrangement also has advantages in reducing the amount of current switched if the selector switch is operated during battery charging. The disconnection of the alternator excitation current just prior to switching of the main battery charging circuit also reduces the magnitude of currents to be switched.

It should be appreciated that the electronic circuitry of the described power generator circuit is mainly provided for monitoring and indication purposes, and that the circuitry involved in the provision of the high voltage DC output is relatively simple and uses inexpensive, robust components.

I claim:

1. A power generator circuit driven by the output of an alternator, comprising:
   input means for receiving a rectified DC output from the alternator; at least one step-up transformer for receiving an AC output from the alternator and raising its voltage; rectifier means for rectifying the output of the at least one step-up transformer; and means for connecting the output of the rectifier means and the rectified DC output from the alternator in series to provide a relatively high voltage DC output.

2. A power generator circuit according to claim 1 where said at least one step-up transformer comprises a pair of step-up transformer, each of said transformers being fed with an AC output from at least one winding of the alternator, and the outputs of respective rectifier means associated with each transformer being added in series to the rectified DC output from the alternator.

3. A power generator circuit according to claim 1 and further comprising connector means for connecting the rectified DC output of the alternator to a pair of welding terminals.

4. A power generator circuit according to claim 1 wherein the alternator comprises a three-phase motor vehicle alternator including a rotor, the circuit including an alternator control circuit and first auxiliary rectifier means connectable between the AC output of the alternator and the alternator control circuit to provide excitation current to the rotor.

5. A power generator circuit according to claim 4 wherein the first auxiliary rectifier means comprises three diodes connected in a full-wave bridge configuration and wherein said input means also includes an alternator rectifier comprised of three diodes connected in a full-wave bridge.

6. A power generator circuit according to claim 1 wherein the alternator comprises a three-phase motor vehicle alternator, and further comprising auxiliary rectifier means connectable between the AC output of the alternator and a vehicle battery to provide charging current to the battery.

7. A power generator circuit according to claim 6 wherein the auxiliary rectifier means comprises three diodes connected in a full-wave bridge configuration.

8. A power generator circuit according to claim 1 and further comprising voltage sensing means for monitoring the relatively high voltage DC output, and regulator means for controlling an excitation current of the alternator to maintain the relatively high voltage DC output substantially constant.

9. A power generator circuit according to claim 1 and further comprising current sensing means for monitoring an output current of the power generator circuit, and indicator means responsive to the current sensing means to provide an indication when the output current exceeds a predetermined limit.

* * * * *